INVENTOR
Willi SCHAPER
By his ATTORNEY

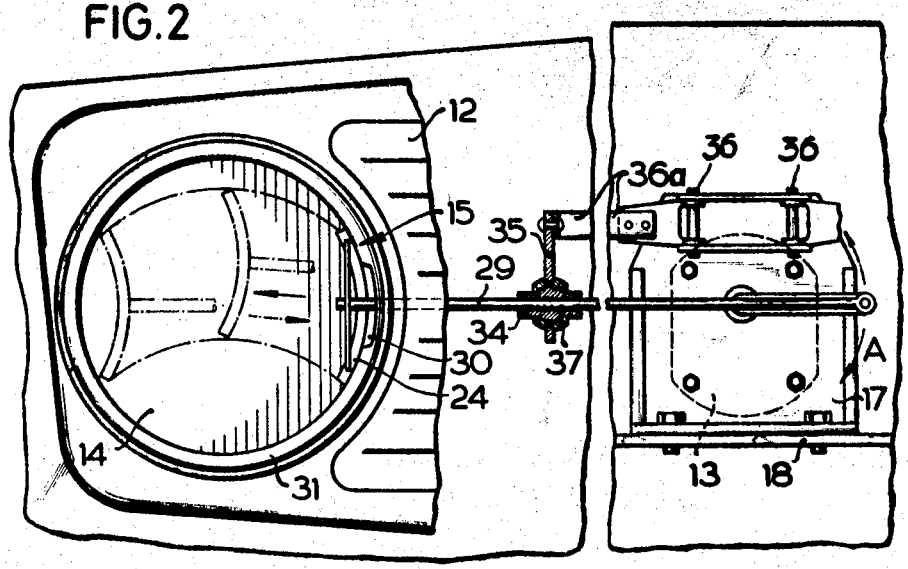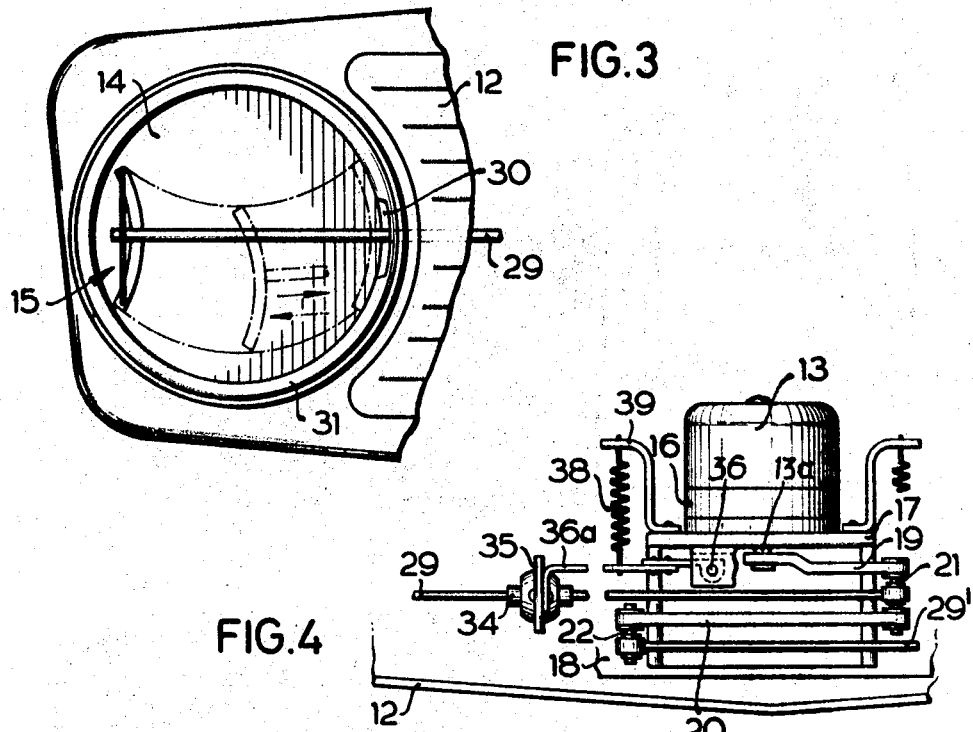

United States Patent Office 3,626,543
Patented Dec. 14, 1971

3,626,543
WIPING ARRANGEMENT FOR VEHICLE HEADLIGHTS
Willi Schaper, Buhl, Germany, assignor to Robert Bosch G.m.b.H., Stuttgart, Germany
Filed Dec. 15, 1969, Ser. No. 889,848
Claims priority, application Germany, Dec. 17, 1968, P 18 15 098.6
Int. Cl. B60s 1/32, 1/36
U.S. Cl. 15—250.21     12 Claims

ABSTRACT OF THE DISCLOSURE

A wiping arrangement for vehicle headlights includes at least one vehicle headlight whose protective lens has an exposed surface subject to contamination which is to be removed, such surface having two transversely spaced edges. A wiper member is located on this surface in contact therewith. Means is provided for reciprocating the wiper member in wiping contact with the surface in a first path from one towards the other of the edges, and thereupon in a second path different from the first path from the other towards the one of the edges.

BACKGROUND OF THE INVENTION

The present invention relates primarily to wiping arrangements, and more particularly to wiping arrangements for the lenses of vehicle lights.

Because of their relatively disadvantageous location on the vehicle body, vehicle lights are subjected to contamination by dirt, mud, snow and the like even more than vehicle windshields. This can be at least annoying and frequently dangerous because depending upon conditions such contamination may reduce the available life to a point where it is no longer sufficient to show the vehicle operator the road ahead. In view of this constructions have already been developed which are analogous to windshield wipers but which wipe clean the protective lens of vehicle lamps, such as vehicle headlights. One such known construction involves the provision of a guide rod at the exposed outer side of the vehicle lens, with a wiper member being guided for movement along this rod by means of a bending-resistant rope or analogous element. However, this known construction requires a drive which is relatively strong because the wiper member itself extends over almost the entire width of the vehicle light lens and covers during one stroke almost the entire surface area of the lens. In addition, and because of this relatively large coverage, the wiping element itself must be relatively long and of strong construction to avoid bending. Finally, in this known arrangement the wiping element can wipe only a substantially rectangular area of the lens so that its use heretofore has been restricted to headlights having substantially rectangularly configurated lenses.

It is evident from this that improvements in this field of art are desirable in keeping with the trend towards increasing the operational safety of motor vehicles.

SUMMARY OF THE INVENTION

The present invention thus has as its general object to provide an improved wiping arrangement for the lenses of vehicle lights.

More particularly it is an object of the present invention to provide such a wiping arrangement which is not possessed of the disadvantages outlined before with respect to the prior art.

Still more particularly the present invention aims to provide such a wiping arrangement which requires only a relatively weak drive, and which is simple in its construction.

A further object of the invention is to provide such an arrangement which is capable of utilization with vehicle lights whose protective lenses have various different configurations, and which is not limited to utilization with protective lenses of rectangular outline.

In pursuance of the above objects, and others which will become apparent hereafter, one feature of my invention resides in a wiping arrangement for the protective lenses of vehicle lights, which briefly stated comprises an element having an exposed surface subject to contamination which is to be removed by wiping, such surface being two transversely spaced edges. A wiper member is provided on this surface in contact therewith. Means is provided for reciprocating the wiper member in wiping contact with the surface in a first path from one towards the other of the edges, and thereupon in a second path different from the first path and in direction from the other towards the one of the edges.

By resorting to the present invention certain important advantages are obtained. Thus, the wiper member itself need have only a length which is smaller than what was heretofore necessary and can still wipe a rather large surface area of the lens. Because of the reduction in the length of the wiper member the latter need not be as strongly constructed as was heretofore necessary, with a concomitant savings in material, and also it requires a correspondingly smaller drive force for effecting its movement, which in turn of course permits the use of drive means not as strong as previously necessary and therefore less expensive. Furthermore, the construction according to the present invention makes it possible to utilize the arrangement for protective lenses of various different configurations, including those of oval or round outline.

The utilization of the present invention with lenses of various different outline, and in fact with lenses of any outline which in practice is used in vehicle lights, is simplified by connecting the drive arm for the wiper members with connecting rods which are so guided that the reciprocatory movement of the connecting rods and thereby of the drive arms and the wiper members has superimposed upon it a tilting or pivoting movement. This is a simple and yet reliable construction which permits the field of wiping to be accommodated to the particular outline of the lens.

A particularly simple and also space-saving construction is obtained if the connecting rods are each directly connected with cranks driven by the output shaft of an electric motor, and if the connecting rods in turn are slidably mounted in the sleeves which themselves are tiltable about axes inclined to the direction of sliding or reciprocatory movement of the connecting rods. Advantageously the cranks are driven in rotation by an electromotor whose direction of rotation is reversible with the reversal of direction occurring no sooner than upon completion of a full revolution of the rotary cranks. In this manner the order in which the wiper members traverse their respective paths is successively reversed, that is each wiper member first traverses the first path and thereupon the second path, and then the order is reversed and the wiper member now next traverses the second path and thereupon the first path.

I wish to emphasize that although the present invention is primarily concerned with an arrangement for wiping the lenses of vehicle lamps such as headlights, its concept evidently has a much wider range of applicability. Thus, it should be equally suitable for the control of windshield wipers, and of course it is not limited to use in or on vehicles but can be used in other circumstances, just as it need not be used only in self-propelled vehicles but could also be utilized in flying craft, in waterborne craft and the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a partly sectional partly broken-away front elevational fragmentary view illustrating one headlight and portions of the arrangement according to the present invention, with the wiper member in non-operated position;

FIG. 3 illustrates the headlight of FIG. 2 but with the wiper member located in its position opposite the non-operated position;

FIG. 4 is a fragmentary partially broken-away top-plan view of portions of the arrangement which are illustrated in FIG. 2.

DESCRIPTION OF THE PREFERRED EMBODIMENTS

Figure 1:
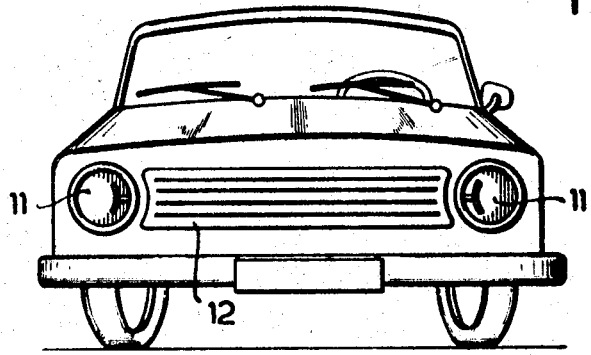
FIG. 1 is a front-elevational view of a motor vehicle equipped with the arrangement according to the present invention.

Discussing now the drawing in detail it will be seen that the invention is illustrated by way of example on a motor vehicle which is shown in FIG. 1 in a front-elevational view and which has a radiator grille 12 and two headlights 11.

Figure 5:
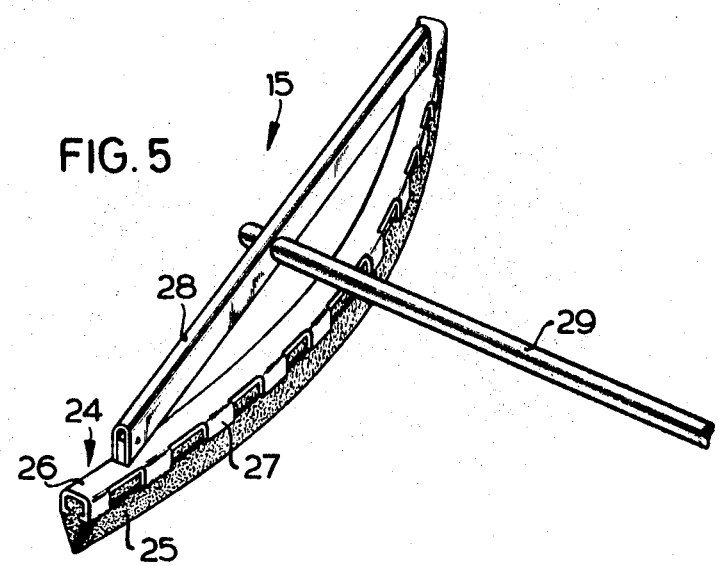
FIG. 5 is a perspective view illustrating a wiper member for use in the arrangement according to the present invention.

As shown in FIG. 5, there is located behind the grille 12 substantially midway between the headlights 11, an electric motor 13 which operates the wiper members 15 each of which is associated with one of the headlights 11 and is intended to clean the exposed surface of the protective lens 14 of the respective headlight 11, with the lenses in the illustrated embodiment being of circular outline. FIG. 4 shows particularly clearly that the electromotor 13 is mounted on a member 17 which in turn is secured to portions of the vehicle body midway between the headlights 11, or at least substantially midway between them. A speed-reduction gear 16 of known construction cooperates with the electro-motor 13 and is mounted along with the same on the element 17. The vehicle body portion is identified with reference numeral 18.

The output shaft of the motor 13, or of the speed reduction gear 16 to be precise, is identified with reference numeral 13a and drives a rotatable crankshaft 21 and a second rotatable crankshaft 22 which are offset with reference to one another by 180°. The crankshaft 21 is connected with the output shaft 13a by means of the linkage 19, and in turn the crankshaft 22 is connected with the crankshaft 21 by means of the linkage 20.

As shown in FIG. 5 the respective wiper members 15 each are composed of a wiper element 24 including a strip 25 of rubber or another elastometric material, and a metallic reinforcing or backing member 26 which overlies and straddles the wider back edge of the strip 25 and is provided with pairs of oppositely arranged clamps 27 which grip the strip 25 to prevent undesired separation of the latter from the member 26. As FIG. 5 shows, the elements 24 are arcuately curved, and this curvature is in a plane paralleling the general plane of the exposed sides of the lenses 14. In the illustrated embodiment the radius of curvature and the chord length correspond to approximately half the diameter of the lens 14. In direction normal to the general plane of the respective lens 14 the members 26 are resiliently yieldable so that the free edges of the strips 25 are capable of tightly conforming themselves to the exposed surface of the respective lens 14. At two longitudinally spaced points of the member 26 there is secured a rigid bracket 28 to which in turn there is fastened a connecting rod 29 which passes through an opening 30 in the frame 31 which mounts the lens 14. This is clearly shown in FIG. 2, and from this figure as well as from FIG. 4 it is evident that the connecting rod 29 is pivotally secured to the crankshaft 21. The other of the wiping members 15 is similarly provided with a connecting rod 29' which is pivotally connected with the crankshaft 22.

FIGS. 3 and 4 show that the connecting rods 29, 29' are each slidable in direction of their respective elongation in a sleeve 34 (one shown) which has an external substantially spherical configuration and is turnably mounted in a correspondingly interiorly configurated socket 37 mounted in a support 35. The respective support 35 in turn is fast with a lever 36a which is connected to the element 17 and turnable about an upright axis 36.

FIG. 4 further shows that one end of a spring 38 is connected to the respective lever 36a whereas the other end of the same spring 38 is connected to a connecting member 39 fast with the element 17. Thus, the respective springs 38 permanently tend to displace the sleeve 34 inwardly—that is away from the grille 12—and thereby tightly displace the strips 25 into engagement with the respective lenses 14.

As mentioned before, the electromotor 13 is of known construction. According to the invention, however, it is an electromotor of a type which will reverse its direction of rotation no sooner than after the crankshafts 21 and 22 each have completed a full revolution. Evidently, the necessary electric switching means for accomplishing this are well known and are therefore not thought to be in need of detailed explanation. They can advantageously be arranged in the housing of the speed reduction gear 16. In addition, an end or limit switch may be provided which may also be located in the housing of the speed reduction gear 16 and which serves to switch off the drive for the wiper elements 15 only when both have returned to their rest or non-operated position shown in FIG. 2, even though the vehicle operator may previously have turned the manually operated actuating switch for these arrangements—which is located advantageously interiorly of the passenger compartment for ready access—to off position. Such arrangements are well known from windshield wipers and assure that, if the operator switches off the manual switch, the windshield wiper will continue to operate until it has returned to its rest or parking position. The same arrangement may advantageously be provided in the construction according to the present invention. The parking position or non-operated rest position is shown in FIG. 2 where the wiper elements 15 are located at that side of the frame 31 which is directed towards the middle of the longitudinal vehicle axis, that is at the sides of the two headlights which face one another.

It will be appreciated that after the operator energizes the electromotor 13 via the non-illustrated manual switch provided for this purpose, the wiper element 24 of the wiper member 15 shown in FIG. 2 will be reciprocated via the crankshaft 19 and the connecting rod 29 between the positions shown in full lines in FIGS. 2 and 3. The sleeve 34 which guides the connecting rod 29 superimposes a tilting movement upon the reciprocatory movement of the connecting rod so that the wiper element 24 performs a movement in one path as it moves from the right-hand side of FIG. 2 towards the left-hand side of FIG. 2, which is different from the movement and path which it traverses as it returns from the left-hand side of FIG. 3 to the right-hand side of the same figure, that is back to the position where it initially started in FIG. 2. Assuming in this connection that upon energization of the electromotor 13 to crankshafts 19 and 20 turn in the direction of the arrow A shown in FIG. 2, the wiper element 24 will first move in the path shown in FIG. 2 towards the left-side of the latter figure, until it has reached its left-hand end position shown in broken lines, and will then return in the path shown in FIG. 3 towards the right-hand side of that figure, which of course corresponds to the right-hand side of FIG. 2. The two paths together cover a substantially elliptical wiping area which covers a large part of the surface area of the respective lens 14, including edge regions thereof. At the center of the lens 14 the paths overlap and thus produce in this region a particularly good cleaning action.

After the crankshafts 19, 20 have completed a full revolution, the electromotor 13 reverses its direction of rotation. Thus, the order in which the two paths which together make one working stroke of the wiper element 24, are traversed is reversed with each successive stroke whereby identically good wiping of the surface areas associated with the respective paths is obtained. The left-hand wiper arrangement traverses the path shown in FIG. 3, that is the lower path. The reason for this is that the crankshafts 21 and 22 are offset with reference to one another through 180°.

It will be appreciated that by suitably selecting the geometric configurations of the drive, for instance the position of the sleeves 34 between motor and headlights, the outline of the area being wiped can be varied within wide ranges and can be accommodated to all intents and purposes to every lens configuration which is in use for such headlights or desired to be used.

A more simplified arrangement than the one illustrated in FIGS. 1–5 can be provided by connecting the sleeves 34 via a simple pivot joint with the support element 35 for pivoting movement about an axis which is normal to the plane of FIG. 2. It is also possible, if necessary or desirable, to subdivide the connecting rods 29, 29' into two pivotably connected sections of which one is connected to the wiper element 24 whereas the other is connected with the respective crankshaft. In this case the respective springs 38 are advantageously connected with one end to one and with the other end to the other of the sections so that the support element 35 for the sleeves 34 can be made fast with the body of the vehicle.

It is also possible to utilize a single crankshaft for effecting the drive of the arrangement if at least one of the two wiper elements 24 can be mounted—that is if such mounting is intended or not objectionable—in a rest or non-operated position other than the one illustrated and discussed. In other words, one or both of the wiper elements 24 would then be located at the side of the respective lens which faces away from the other lens.

If desired the arrangement may be combined with a conventional washing installation which may be similar to windshield washers and which for instance will dispense a certain quantity of washing fluid onto the respective lens when the wiping arrangement is energized. A further embodiment provides for forming the strips 25 with an additional relatively stiff scraping edge which serves to remove by scrapping contaminants which are not otherwise readily dislodged from the respective lens 14.

It will be understood that each of the elements described above, or two or more together, may also find a useful application in other types of applications differing from the types described above.

While the invention has been illustrated and described as embodied in a wiping arrangement for the lenses of vehicle lights, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement of the character described, particularly a wiping arrangement for the lenses of vehicle lights, comprising an element having an exposed surface subject to contamination which is to be removed by wiping, said surface having two transversely spaced edges; a wiper member on said surface and in contact therewith; and means for reciprocating said wiper member in wiping contact with said surface in a first path in direction from one towards the other of said edges, and thereupon in a different second path in direction from said other towards said one edge, said means comprising drive means having a rotatable output shaft and a crank mounted for rotation by the latter, and motion-transmitting means including a connecting rod connected with said wiper member and said crank for reciprocation by the latter, a guide member slidably accommodating a portion of said connecting rod, and a socket accommodating said guide member for pivotal movement about an axis inclined to the direction of reciprocation of said connecting rod.

2. An arrangement as defined in claim 1, wherein said element is the protective lens of a vehicle headlight.

3. An arrangement as defined in claim 1, said guide member being a sleeve having a substantially spherical outer configuration, and said socket turnably accommodating said sleeve therein.

4. An arrangement as defined in claim 3; further comprising support means for said arrangement; and biasing means connected with said support means and said wiper member and operative for permanently biasing said wiper member into engagement with said exposed surface.

5. An arrangement as defined in claim 4, said biasing means comprising a carrier mounted on said support means tiltable about an axis at least substantially parallel to said exposed surface and located at the side of said element which is opposite said surface said carrier carrying said socket; and a spring connected to said support means and said carrier and permanently urging the latter to tilt about said axis towards said support means.

6. An arrangement as defined in claim 1, said drive means including reversible electromotor means having said output shaft and being operative for reversing the direction of rotation of said output shaft subsequent to completion of a full revolution by said crank.

7. An arrangement as defined in claim 1, said wiper member being arcuately curved in a plane extending in parallelism with the general plane of said exposed surface.

8. An arrangement as defined in claim 1, said wiper member having a length in direction normal to its reciprocation which is so correlated with said first and second paths that the latter overlap at least in part.

9. An arrangement as defined in claim 1, said wiper member being elastically yieldable in a direction at least substantially normal to the general plane of said exposed surface.

10. An arrangement as defined in claim 8, said wiper member comprising an elongated strip of elastomeric material having two opposite sides one of which abuts and wipes over said exposed surface, and a bracket of resilient metallic material overlying the other of said opposite sides and including gripping portions gripping said strip and preventing undesired separation of the same from said bracket.

11. An arrangement as defined in claim 10, said strip of elastomeric material comprising a wiping edge at said one side.

12. An arrangement as defined in claim 5; further comprising an additional element spaced from and similar to the first-mentioned element; an additional wiper member similar to the first-mentioned wiper member and cooperating with said additional element and wherein said means comprises an additional crank mounted for rotation by said output shaft, an additional connecting rod cooperating with said additional crank, an additional sleeve and an additional socket, and an additional carrier and spring, all cooperating with said additional wiper member.

References Cited

UNITED STATES PATENTS

| | | | |
|---|---|---|---|
| 1,270,197 | 6/1918 | Parker | 15—250.21 |
| 2,589,339 | 3/1952 | Carson | 15—250.40 |
| 2,644,187 | 7/1963 | Lacy | 15—250.35 |
| 3,058,142 | 10/1962 | Pollock | 15—250 A |
| 3,422,480 | 1/1969 | Kato | 15—250.27 X |

PETER FELDMAN, Primary Examiner

U.S. Cl. X.R.

15—250.13, 250.3, 250.35